(12) United States Patent
Flomenhoft (10) Patent No.: US 9,634,732 B2
(45) Date of Patent: Apr. 25, 2017

(54) APPARATUS AND METHOD FOR INDUCTIVE POWER TRANSFER ON AN ELECTRIFIED ROADWAY USING A ROTATING SECONDARY INDUCTOR

(75) Inventor: Gary Flomenhoft, Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 296 days.

(21) Appl. No.: 13/882,737

(22) PCT Filed: Nov. 5, 2011

(86) PCT No.: PCT/US2011/059479
§ 371 (c)(1),
(2), (4) Date: Apr. 30, 2013

(87) PCT Pub. No.: WO2012/061794
PCT Pub. Date: May 10, 2012

(65) Prior Publication Data
US 2013/0214706 A1      Aug. 22, 2013

Related U.S. Application Data

(60) Provisional application No. 61/410,385, filed on Nov. 5, 2010.

(51) Int. Cl.
*H02P 1/00* (2006.01)
*H01F 37/00* (2006.01)
(Continued)

(52) U.S. Cl.
CPC .......... *H04B 5/0037* (2013.01); *B60L 11/182* (2013.01); *B60L 2200/26* (2013.01);
(Continued)

(58) Field of Classification Search
CPC ........ H04B 5/00; H04B 5/0037; B60L 11/182
(Continued)

(56) References Cited

U.S. PATENT DOCUMENTS

4,139,071 A * 2/1979 Tackett .................... B60K 1/00
                                                          180/165
6,885,111 B2 * 4/2005 Volpi ...................... B29D 30/48
                                                          290/1 R
(Continued)

*Primary Examiner* — Bentsu Ro
*Assistant Examiner* — Gabriel Agared (57) ABSTRACT

The invention described herein provides an energy transfer system via a tire based inductor system. By using the tire, the area inside the tire, the tire rim, or the wheel as the inductive pick-up for a powered roadway system the prior art problems are solved. Namely, since the tire/wheel is always in contact, or near contact with the road, the air gap is reduced to a minimum, and substantially fixed, distance. By mounting the secondary on the perimeter of a wheel, relative motion between the road and inductor is minimized. In addition, the pick-up can be encased in the tire, eliminating the problem of road debris, snow and ice entirely. Also, some heating of the tire due to electrical losses may enhance traction and tread performance on snowy or wet roads. In all configurations, the vehicle's wheel suspension adjusts vertically adjusting for road imperfections and obstacles.

20 Claims, 7 Drawing Sheets

(51) Int. Cl.
*H04B 5/00* (2006.01)
*B60L 11/18* (2006.01)

(52) U.S. Cl.
CPC ..... *B60L 2210/10* (2013.01); *B60L 2240/421* (2013.01); *Y02T 10/642* (2013.01); *Y02T 10/7005* (2013.01); *Y02T 10/7072* (2013.01); *Y02T 10/7216* (2013.01); *Y02T 90/122* (2013.01); *Y02T 90/127* (2013.01); *Y02T 90/14* (2013.01)

(58) Field of Classification Search
USPC .......................................... 318/139; 307/104
See application file for complete search history.

(56) References Cited

U.S. PATENT DOCUMENTS

| | | | | |
|---|---|---|---|---|
| 7,508,085 B2* | 3/2009 | Martineau | ................ | H02N 2/18 |
| | | | | 290/1 A |
| 7,679,210 B2* | 3/2010 | Zhu | ................ | F03D 9/002 |
| | | | | 290/1 R |
| 8,841,785 B2* | 9/2014 | Theuss | ................ | B60C 19/00 |
| | | | | 290/1 R |
| 2011/0031047 A1* | 2/2011 | Tarr | ................ | B60L 5/005 |
| | | | | 180/65.1 |

* cited by examiner

APPARATUS AND METHOD FOR INDUCTIVE POWER TRANSFER ON AN ELECTRIFIED ROADWAY USING A ROTATING SECONDARY INDUCTOR

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

1. U.S. provisional patent application 61/410,385 entitled "Elastomeric Tire Secondary inductor for Inductive Power Transfer on Electrified Roadway", naming Gary Flomenhoft as inventor, filed Nov. 5, 2010.

BACKGROUND

1. Field of Use

These teachings relate generally to a system and method for inductively coupling power to electric vehicles and more particularly to an apparatus and method for inductively coupling power through the tires, rim, or wheel of an electric, vehicle.

2. Description of Prior Art (Background)

Electric powered transportation is generally more efficient and less polluting than petroleum powered vehicles. Vehicles traveling on fixed routes such as subways, streetcars, and railroad trains often use electric motive power due to its efficiencies. These vehicles might use a catenary wire, overhead wire, or third rail system to transmit power to the vehicle.

The capability to transmit electricity to vehicles enables electric vehicles to have nearly unlimited range without having to recharge onboard batteries or refuel with liquid hydrocarbons, e.g., gasoline for comparatively inefficient, internal combustion engines. For example, the average efficiency of an internal combustion engine in conversion of gasoline to motion is about 12-15% whereas electric vehicles convert, about 80-90% of electric power to motion.

The primary limitation for electric vehicles such as cars and trucks has been the storage or transmission of electricity onboard the vehicle. For example, lithium batteries typically used for powering electric vehicles contain 100 WH/kg and take hours to recharge.

The primary solutions currently being proposed for electric vehicle transportation are better batteries and faster charging, battery swapping systems, and plug-in hybrid vehicles. Each one has their limitations and will not solve the problem of electric vehicle transportation in the long run.

Batteries and fast charging: in general, the time for charging lithium-ion batteries is unacceptable for mainstream usage. Even if lithium-ion batteries could be theoretically recharged in 5 minutes, the infrastructure needed to transmit the tremendous currents needed for fast charging, on the order of 2000 Amps for each vehicle, is unrealistic and not feasible.

Battery Swapping: Battery swapping could theoretically solve the problem of fast energy replacement in electric vehicles, but the standardization required has no precedent (consider electric hand tools), the logistics are unwieldy, and it was explored during the 1990's unsuccessfully. It also fails the criteria of being a superior system to current technology.

Plug-in hybrid Vehicles: Plug-in hybrid vehicles run primarily by electric, power, with internal combustion back-up combining the best features of both. In the short term they dramatically increase the efficiency of vehicles by running mainly on electric power, and using internal combustion power as a backup or secondary power source. Hybrid vehicles may serve as a transitional vehicle to a pure electric vehicle future. But in the long run they fail the criteria of avoiding petroleum. Even using bio-fuel they still use the inefficient internal combustion engine.

Other prior art solutions to powering electric vehicles include inductively coupling power from an electrified roadway across an air gap to the electric vehicle. However, it will be appreciated that the feasibility of transmitting power to vehicles through induction using wires buried in the roadway has been proven indoors and in warm, sunny climates such as California and Florida where an inductive pickup is positioned such that the maximum air gap is 10 cm.

However, the problem of an inductive, pick-up hanging under the car close to the road in snow and ice is a previously unsolved problem. It will be appreciated that such an arrangement is unsuitable for any less-than-ideal road conditions since the pick-up would be subject to road debris, snow and ice during, had weather.

More recent prior solutions have placed the secondary pick-up at a greater distance from the road, such as 5 inches, to avoid contact with debris. The greater air gap has the disadvantage of lower transmission efficiency.

BRIEF SUMMARY

The foregoing and other problems are overcome, and other advantages are realized, in accordance with the presently preferred embodiments of these teachings.

The characteristic of an inductor such as found in electric motors, generators, or magnets is an insulated copper wire or bar wound around a ferrous metal pole Or poles to increase magnetic flux. A radial tire contains plain steel metal belts. In one embodiment of this invention, steel belts within a tire can be used to serve as the pole of an inductor. Copper wire wound around the tire's internal steel belts create an inductor, which serves as the secondary pick-up for an electric powered roadway vehicle. Since there are typically four tires on the vehicle, the power requirements for each tire can be reduced by four if all four tires employ this invention. Slip rings or other rotating electrical transmission system devices that are well known can then be used to conduct the electricity to an electric drive system.

In another embodiment of this invention, ferrous materials other than a tire's steel belts are used in the tire to create an integral inductor. The inductor material can be added within the tires structure, added to the inside of the tire, supported in the space between the tire and rim (as one example, supported by an inner tube), or attached to or supported by the rim. Such embodiments would be applicable for vehicle or tire types that do not typically incorporate one or more steel belts, or could be a way of retrofitting the capability to vehicles without tires with an integral inductor.

In accordance with one embodiment of the present invention an apparatus for inductive power transfer on an electrified roadway is provided. The apparatus includes a steel belted radial tire; and, an insulated electric wire, wherein the insulated electric wire is wrapped around the steel belt to form an in-tire inductor. The insulated electric wire may be any suitable electric wire such as copper wire.

Another embodiment includes the use of magnetic materials embedded in the tire itself such as iron or ferrite particles forming a composite with vulcanized rubber or elastomeric composites.

The invention is also directed towards a method for inductive power transfer to an electric vehicle on an electrified roadway. The method includes collocating an inductive pick up device within the electric vehicle's tire in contact with the roadway. The method further includes inductively coupling power from the electrified roadway via the inductive pickup; and, driving an electric drive motor with the inductively coupled power.

In accordance with another embodiment of the present invention a shielded mobile inductor system for inductively coupling power from an electrified roadway is provided. The system includes at least one tire; and, at least one inductor positioned integral with the at least one tire.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2D1 is a pictorial illustration of an inductive pickup with a secondary air core in accordance with the present invention shown in FIG. 1D

FIG. 2E1 is a pictorial illustration of an inductive pickup with a secondary ferrite core in accordance with the present invention shown in FIG. 1;

FIG. 2F1 is a pictorial illustration of multiple configurations of the inductive pickup in accordance with the present invention shown in FIG. 1;

DETAILED DESCRIPTION

Figure 1:
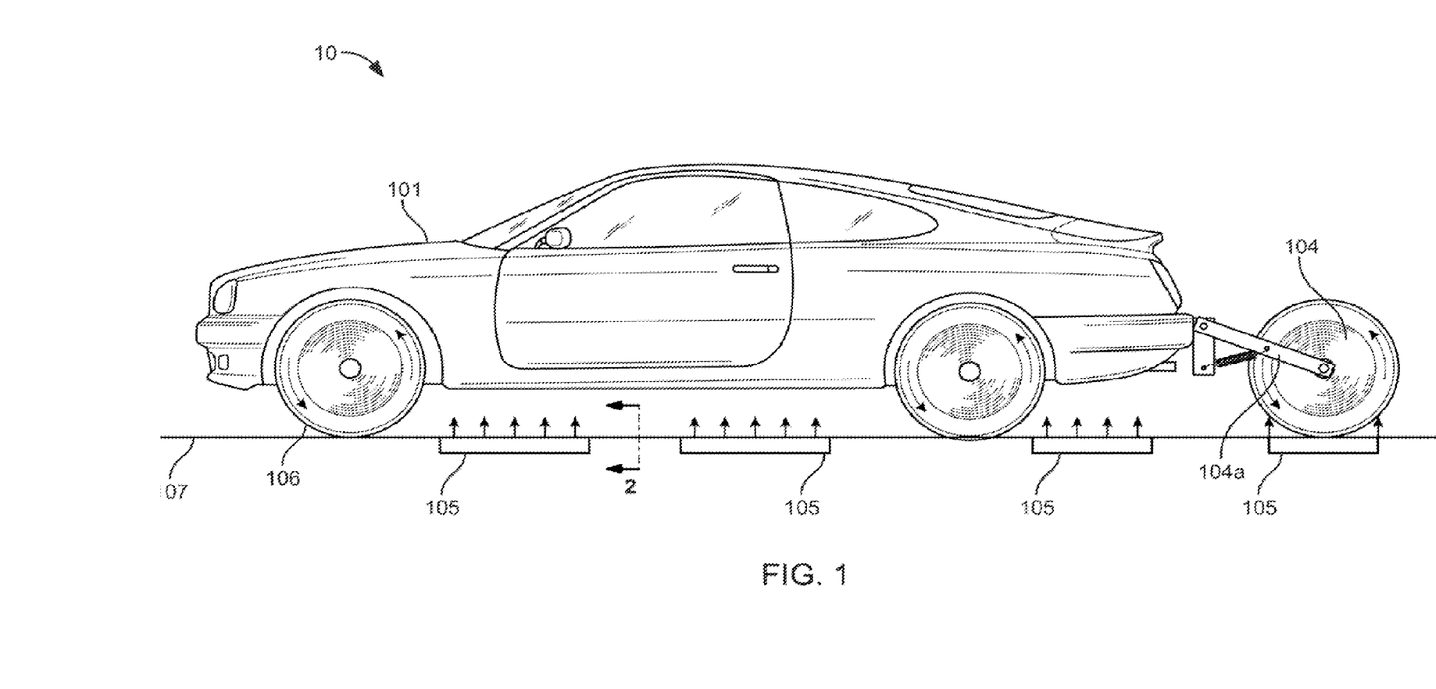
FIG. 1 is a schematic diagram illustrating one embodiment of the present invention of an inductive power transfer apparatus embedded within electric vehicle tires on an electrified roadway.

Referring now to FIG. 1, there is shown a schematic diagram illustrating one embodiment of the present invention of an inductive power transfer apparatus embedded within electric vehicle tires 106 on an electrified roadway 107. The energy transmission arrays 105 are preferably disposed beneath a roadway surface, although transmission systems disposed on the surface are contemplated as well. The embedded energy reception system 106 is on one or more axels of vehicle 101, which uses the transferred electrical power to either charge an onboard energy storage device unit (FIG. 3, item 18) or for propulsion/use directly. It will also be that any suitable number of embedded energy reception system 106 configurations may be employed, such as a "fifth" wheel 104 mechanically linked to vehicle 101 via mechanical linkage 104A shown in FIG. 1

Figure 2:
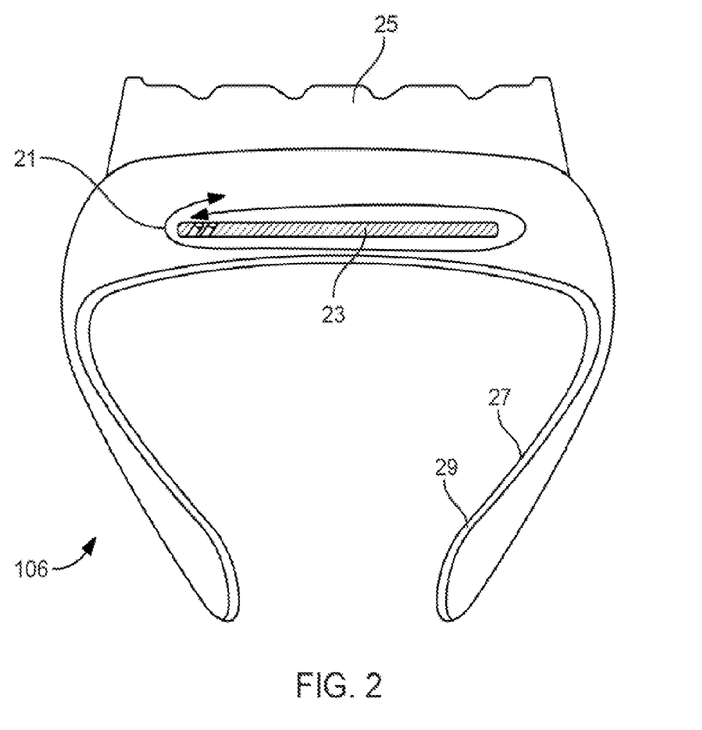
FIG. 2 is a cross section schematic diagram illustrating implementation of an inductor pickup within a steel belted radial tire in accordance with the invention shown in FIG. 1.

Referring also to FIG. 2, there is shown a cross section schematic diagram of electric vehicle tires 106 illustrating implementation of an inductor pickup within a steel belted radial tire in accordance with the invention shown in FIG. 1. Copper wires 21, or any suitable wiring, are wound around metal belts 23 forming an inductive pick up. It will be appreciated, and discussed herein, that any suitable inductive pickup may be located within internal tire wall 27, within tire bead 29, within tread area 25, or on the rim or wheel, or otherwise proximal to an inner or outer surface of the tire. It will be appreciated that the inductive pickup positioned within and near the outer surface of the tire minimizes the air gap, or distance, between the inductor pickup and the electrified roadway 107 and advantageously maximizes the coupling efficiency between the electric vehicle tires 106 and electrified roadway 107.

Figure 2A:
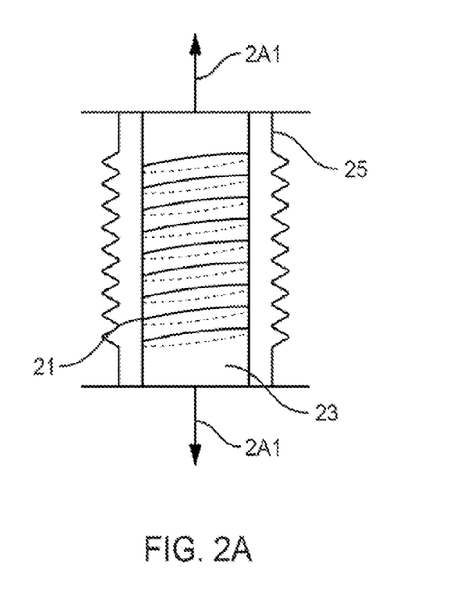
FIG. 2A is a top view cutaway in accordance with the invention shown in FIG. 2.

Referring also to FIG. 2A there is shown a top view cutaway in accordance with the invention shown in FIG. 2. Copper wires 21, or any suitable wiring, are wound around metal belts 23 forming an inductive pick up; forming, or generating, when electrified, magnetic field lines 2A1 axial to electric, vehicle tires 106.

Figure 2B:
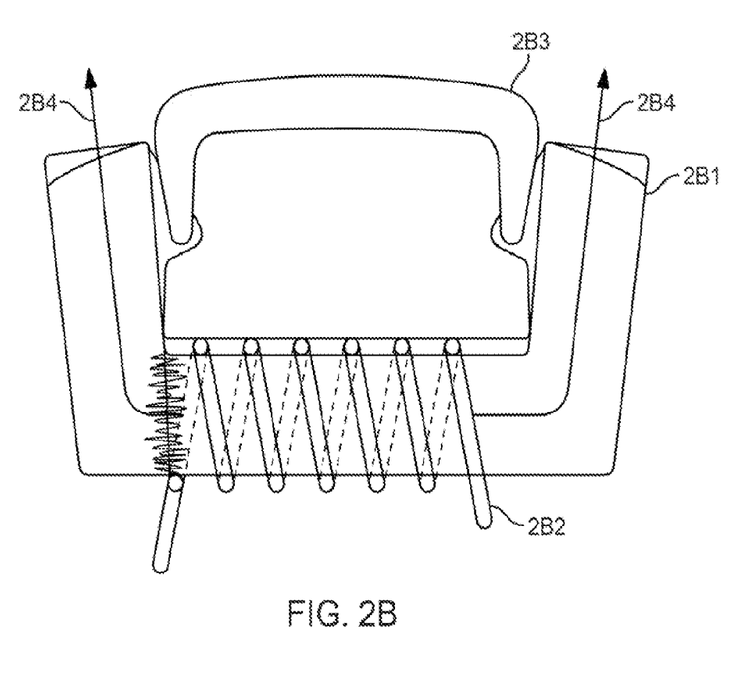
FIG. 2B is a rim mounted inductive pickup in accordance with the present invention shown in FIG. 1.

Referring also to FIG. 2B there is shown a cutaway view of tire 2B5 with rim 2B3 mounted inductive pickup in accordance with the present invention shown in FIG. 1. Copper wires 2B2, or any suitable wiring, are wound around inductor core 2B1 forming an inductive pick up; forming, or generating, when electrified, magnetic field lines 2134 transverse to electric vehicle tires 106.

Figure 2C:
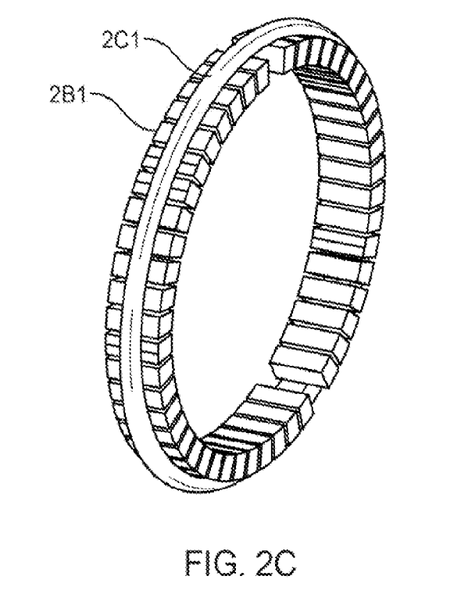
FIG. 2C is a pictorial illustration of the rim mounted inductive pickup 2B1 in accordance with the present invention shown in FIG. 2B.

Referring also to FIG. 2C there is shown a pictorial illustration of the rim mounted inductive pickup 2B1 attached to tire rim (FIG. 2B: item 2B3). It will be appreciated that tire 2B5 may be any suitable tire.

Figure 2D:
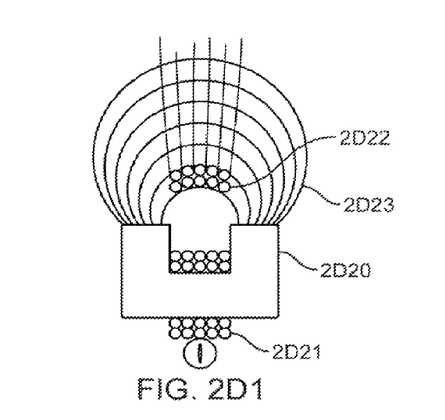
Figure 2D:
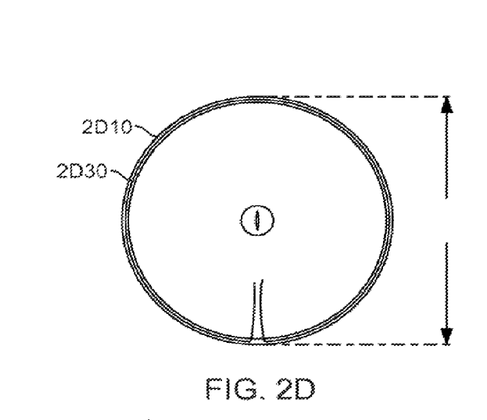
FIG. 2D is a pictorial illustration of an air cote configurations of the inductive pickup in accordance with the present invention shown in FIG. 1

Referring now to FIGS. 2D and 2D1 there is shown one configuration of the inductive pickup in accordance with the present invention shown in FIG. 1. FIG. 2D1 shows a single wheel mounted air core defined by conductive wires 2D22. Also shown in FIG. 2D1 is a roadside primary inductor 2D20 wrapped by conductive wires 2D21. Flux lines 2D23 are generated when conductive wires 2D21 are electrified by a suitable current alternating at to suitable frequency. It will be further understood that conductive wires 2D21 and 2D22 may be any suitable conductive wire, such as, for example, Litz wire in order to operate at high frequencies. FIG. 2D is a pictorial side view of a tire rim 2D10 with an air core configuration defined by winding loop 2D30.

Figure 2E:
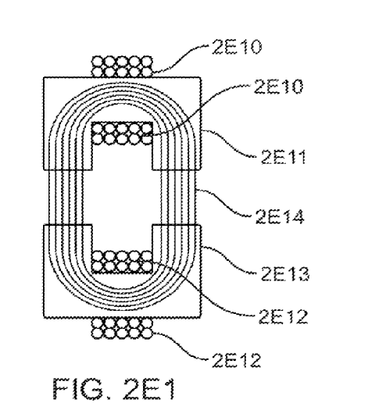
Figure 2F:
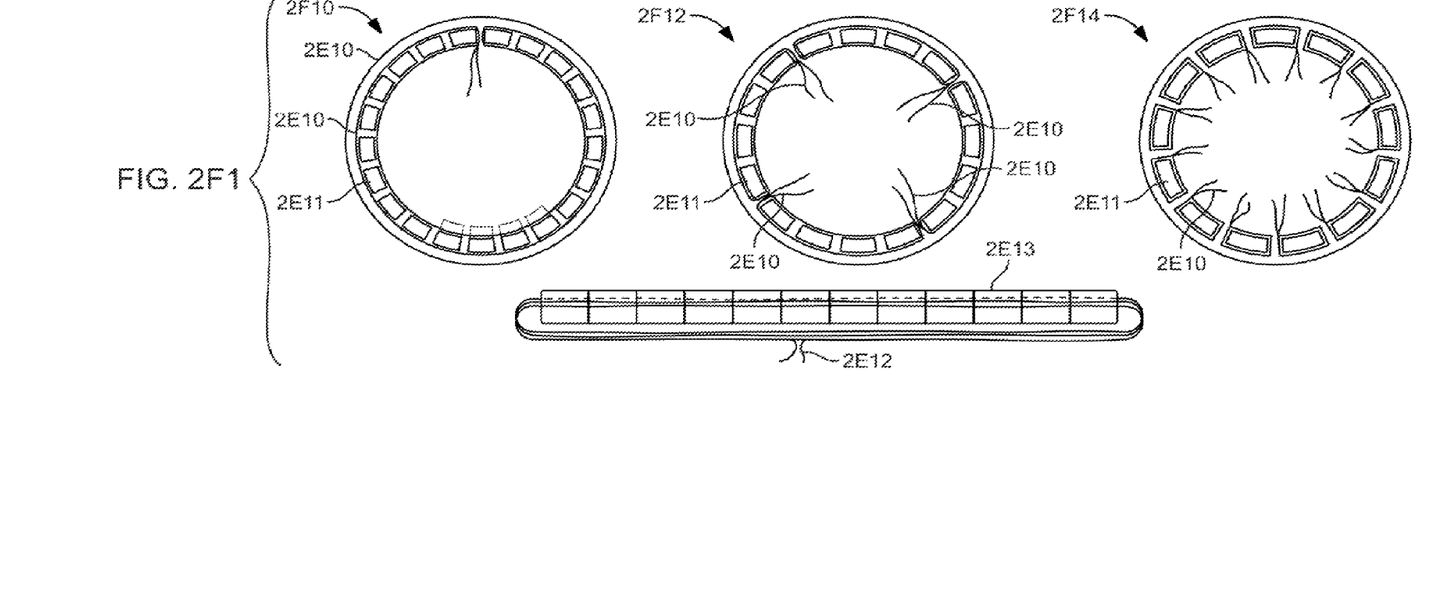

Referring now to FIG. 2E1 and FIG. 2F1 there is shown multiple configurations of the inductive pickup M accordance with the present invention. FIG. 2E1 shows a single wheel mounted inductor core 2E11 wrapped by conductive wires 2E10. It will be appreciated that core 2E11 may be any suitable core. Also shown in FIG. 2E1 is the roadside primary inductor 2E13 wrapped by conductive wires 2E12. Flux lines 2E14 are generated when conductive wires 2E12 are electrified by a suitable current alternating at a suitable frequency. It will be further understood that conductive wires 2E10 and 2E12 may be any suitable conductive wire, such as, for example, Litz wire in order to operate at high frequencies.

Still referring to FIG. 2F1 there is shown a single winding configuration 2F10 with conductive wire 2E10 around all rim mounted cores 2E11. Another configuration 2E12 shows conductive wire 2E10 around a subset of the rim mounted cores 2E11. Finally, configuration 2F14 shows conductive wire 2E10 around each of the rim mounted cores 2E11. Also shown in FIG. 2F1 are roadside, or off vehicle, primary cores 2E13 and conductive wire 2E12.

Figure 3:
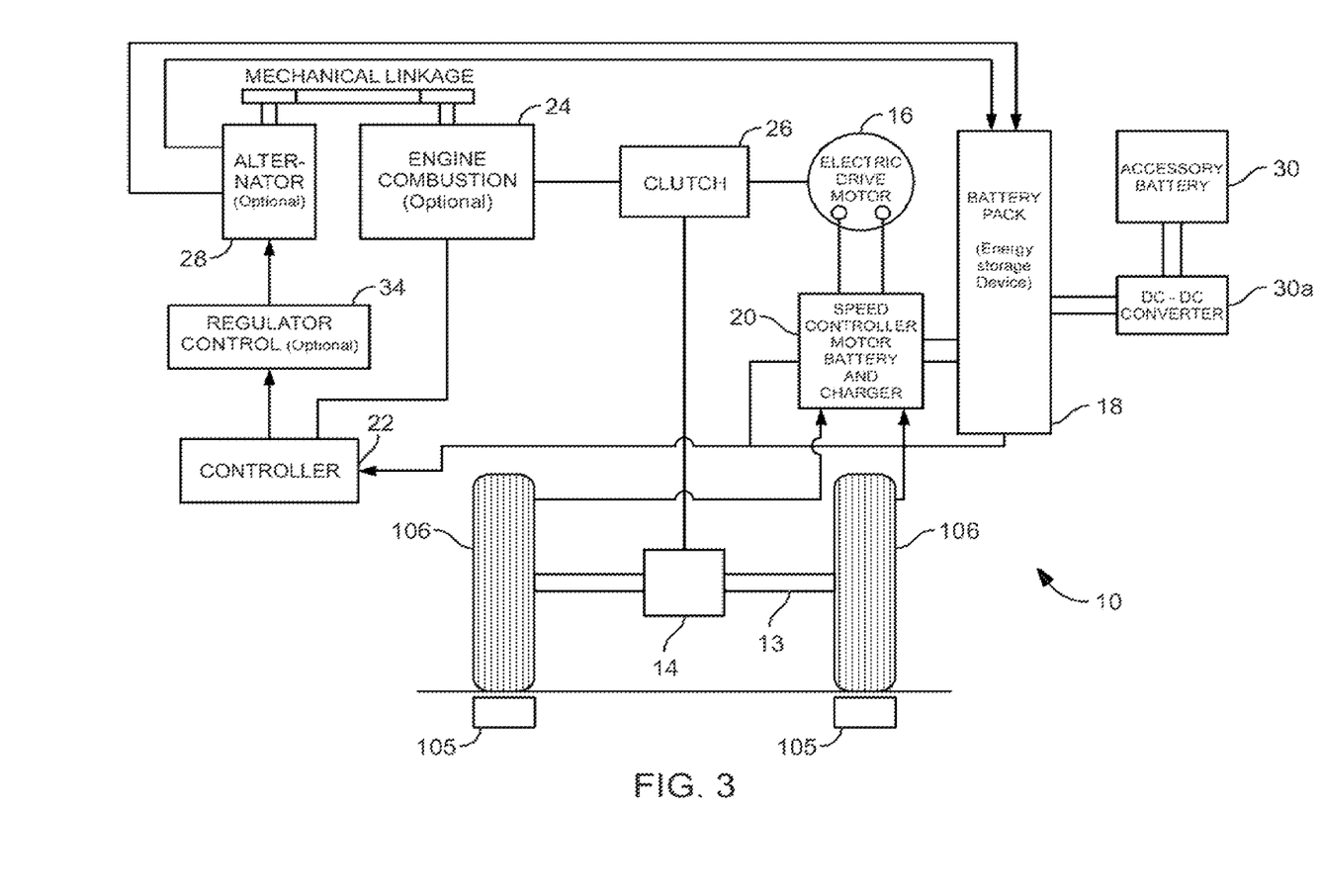
FIG. 3 is a block diagram illustrating the power train and controls for an electric vehicle in accordance with the invention shown in FIG. 1.

Referring also to FIG. 3, there is shown a block diagram illustrating the power train and controls for an electric vehicle in accordance with the invention shown in FIG. 1. The power train and controls 10 of the present invention includes a battery pack 18, an electric drive motor 16 powered by the battery pack 18 and an optional internal combustion engine 24. A controller 22 determines the prime mover of the vehicle, i.e., whether the electric motor 16 is powered by battery pack 18 or power inductively coupled from energy transmission arrays 105 via inductive power transfer apparatus embedded within electric vehicle tires 106. Where an internal combustion engine, or other non-electric power source is available the controller will determine a priority power sourcing scheme dependent on power requirements and available power, discussed further herein.

The power train and controls 10 includes a pair of inductive power transfer apparatus embedded within ground engaging drive wheels electric vehicle tires 106. The wheels 106 could be either the rear wheels or the front wheels of the vehicle. In addition, it is within the scope of the present invention to have the inductive power transfer apparatus embedded within ground engaging non-drive wheels such as a "fifth" wheel (FIG. 1, item 104).

The wheels 106 are mechanically connected by a drive axle 13 to a differential 14, the housing of the differential 14 being attached to a housing of a transmission (not shown). The transmission may be controlled in a conventional manner, such as, for example, by a gear shift lever or automatic transmission.

The power train and controls 10 also includes an optional internal combustion engine 24. An electric clutch 26 positioned between the electric motor 16 and the engine 24 will allow the engine 24 to assist in driving the wheels 12 if the controller 22 determines that the electric motor 16 needs assistance. Similarly, the battery pack 18 may be supplemented with inductive power derived from energy transmission arrays 105 via inductive power transfer apparatus embedded within electric vehicle tires 106. Alternatively, the inductive power derived from energy transmission arrays 105 via inductive power transfer apparatus embedded within electric vehicle tires 106 could be designated as the prime power source with supplemental power from battery pack 18 as required.

For example, if controller 22 determines that the electric motor 16 is not capable of accelerating the vehicle, due to loss of inductive power derived from energy transmission arrays 105 via inductive power transfer apparatus embedded within electric vehicle tires 106, the controller 22 will cause the power derived from the battery pack to be brought on line, as described below, to assist in accelerating the vehicle 101.

Similarly, if controller 22 determines that the battery pack 18 and the inductive power derived from energy transmission arrays 105 via inductive power transfer apparatus embedded within electric vehicle tires 106 is not sufficient to power the electric drive motor 16 to accelerate the vehicle 101, then, if available, combustion engine 24 may be engaged to provide supplemental power.

While the battery pack 18 may assist powering the electric motor 16 if needed, it may not desirable to use the battery pack 18 in this fashion since accelerating the vehicle with the battery pack 18 depletes the battery pack 18. It will be appreciated that it may be desirable to maintain the battery pack 18 at maximum charge for use when inductive power is not available.

If at any time during the driving of the vehicle 101 the controller 22 senses that surplus power is available, either from the inductively coupled power 106 or the optional combustion engine 24 that surplus power may be used to charge battery pack 18 an accessory battery 30.

The controller 22 includes an optional regulator control 34 which controls the voltage output of the alternator 28. The regulator control 34 adjusts the voltage of the alternator 28.

Still referring to FIG. 3, DC-DC converter 30A charges the accessory battery 30 as required.

Figure 4A:
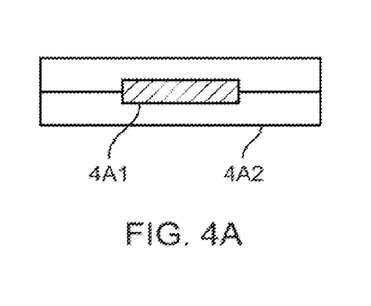
FIGS. 4A-4E are pictorial diagrams showing alternate embodiments for implementing an inductive pick up in accordance with the invention shown in FIG. 1.
Figure 4B:
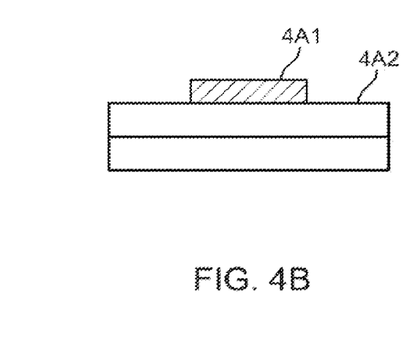
Figure 4C:
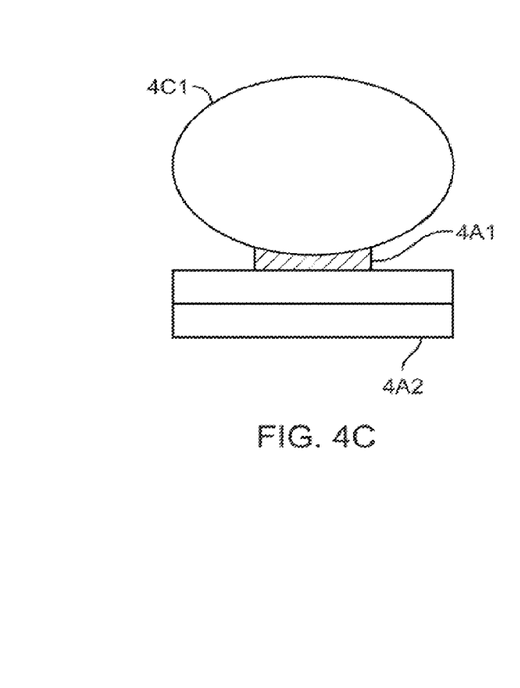
Figure 4D:
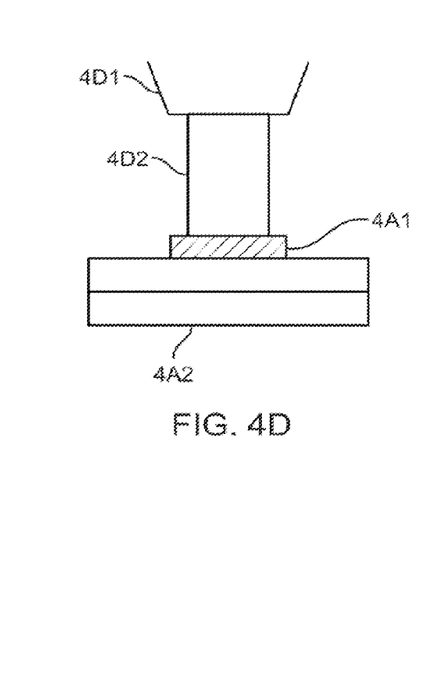
Figure 4E:
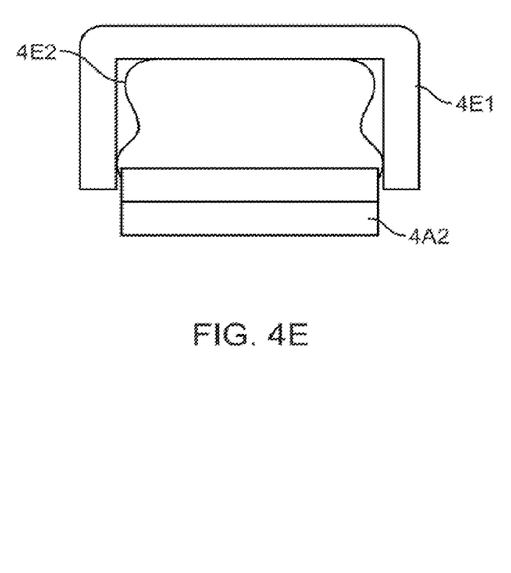

Referring also to FIG. 4A-4E there are shown pictorial diagrams showing alternate embodiments for implementing the inductive pick up 105 in accordance with the invention shown in FIG. 1. FIG. 4A shows the inductor 4A1 imbedded within tire material 4A2. FIG. 48 shows inductor 4A1 adjacent to tire material 4A2. FIG. 4C shows inductor 4A1 adjacent to tire material 4A2 and held in place by inflated inner tube 4C1. Finally, FIG. 4D shows inductor 4A1 adjacent to tire material 4A2 and supported by bracket 4D2 and interior of wheel 4D1. FIG. 4E shows a rim mounted configuration where inductor pickup 4E1 is mounted to tire rim 4E2.

Figure 5:
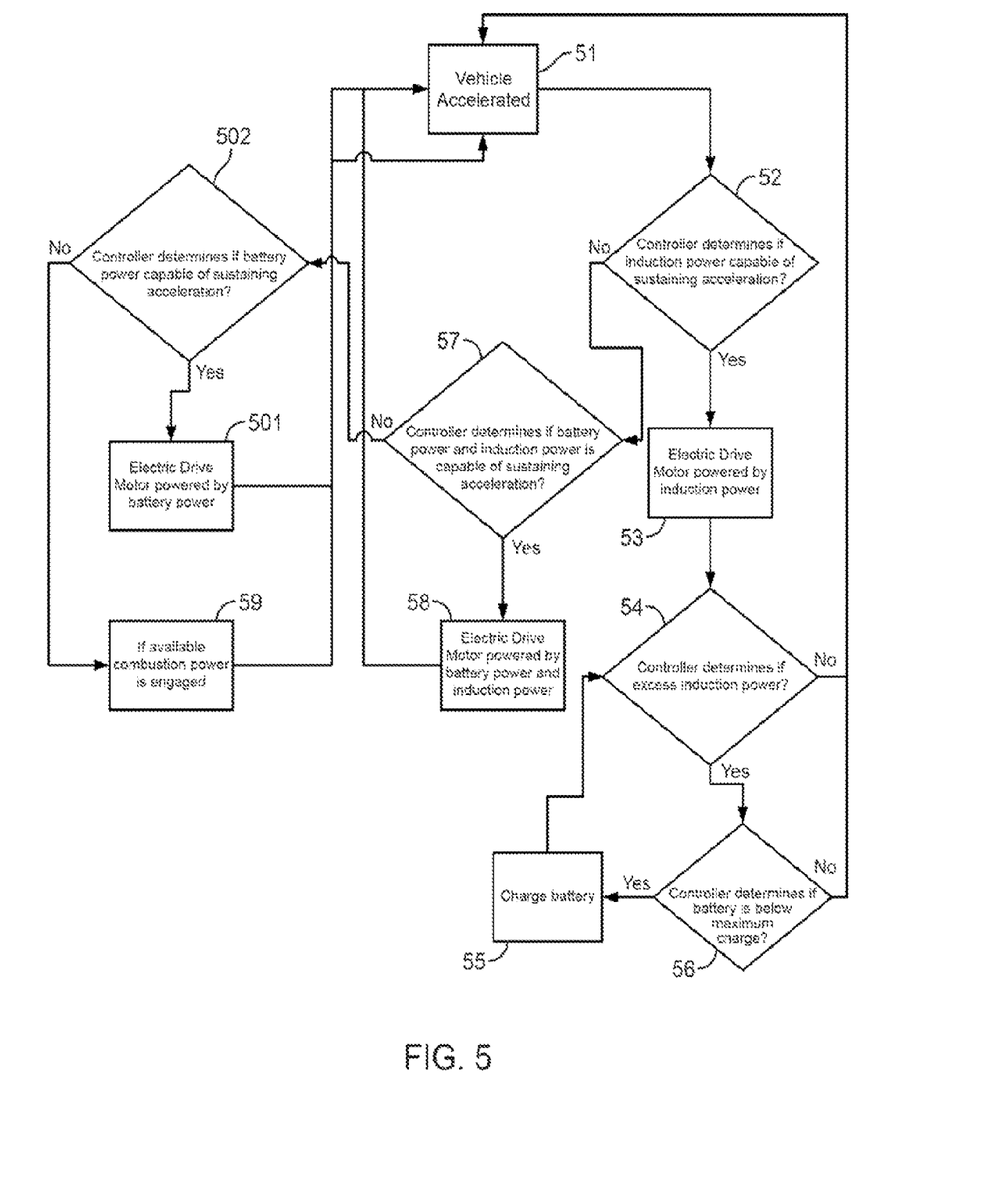
FIG. 5 is a method flow chart for determining power sourcing in accordance with the invention shown in FIG. 3.

Referring also to FIG. 5 there is shown a method flow chart for one way of determining power sourcing in accordance with the invention shown in FIG. 3. As shown in FIG. 5 when the vehicle is accelerated or power is otherwise required 51 the controller 22 determines 52 if power derived from transmission arrays 105 via inductive power transfer apparatus embedded within electric vehicle tires 106 is sufficient to power the electric drive, motor 16 to accelerate the vehicle 101. If inductive power via the pathway described is not sufficient the controller 22 determines 57 if battery power from battery pack 18 coupled with inductive power is sufficient to power the electric drive motor 16 to accelerate the vehicle 101. If decision 57 determines that inductive power coupled with battery power is not sufficient to power the electric drive motor, for example, if the vehicle 101 is not traveling on an electrified roadway, controller determines 502 if the battery pack 18 is capable of powering the electric drive motor 16. If the battery pack 18 operating independently cannot provide sufficient power than controller 22 engages 59 optional combustion engine 24.

Still referring to FIG. 5, if controller 22 determines that there is sufficient inductive power then electric motor 16 is powered 52 by inductive power alone. It will be appreciated that this powering scheme or profile conserves battery power until battery power is required. Further controller 22 determines 54 if there is excess power available and if the battery is below minimum charge 56. If below minimum charge than battery pack 18 is charged with excess inductive power 55.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. An apparatus for inductive power transfer from an electrified roadway to an electric motor, the apparatus comprising:
   a steel belted radial tire;
   an insulated electric wire, wherein the insulated electric wire is wrapped around the steel belt to form an in-tire pickup inductor for inductively transferring power from the electrified roadway; and
   a battery pack for providing battery pack power to the electric drive motor;
   a controller, wherein the controller determines if there is sufficient inductive power to power the electric motor, and wherein if the controller determines there is insufficient inductive power, the controller determines if there is sufficient inductive power and battery pack power to power the electric motor.

2. The apparatus as in claim 1 wherein the insulated wire is insulated copper wire.

3. The apparatus as in claim 1 further comprising:
   an electric drive motor for rotating the steel belted radial tire; and
   a motor speed controller for combining battery pack power with power derived from the in-tire inductor.

4. The apparatus as in claim 3, wherein the controller determines the amount of inductive power and battery pack power provided by the motor speed controller to the electric drive motor.

5. The apparatus as in claim 4 further comprising an internal combustion engine.

6. A shielded mobile inductor system for inductively coupling power from an electrified roadway to an electric motor, the system comprising:
   a battery pack for providing battery pack power;
   at least one tire;
   at least one inductor positioned integral with the at least one tire; and
   a controller, wherein the controller determines if there is sufficient inductive power to power the electric motor, and wherein if the controller determines there is insufficient inductive power, the controller determines if there is sufficient inductive power and battery pack power to power the electric motor.

7. The shielded mobile inductor system as in claim 6 wherein the at least one inductor positioned integral with the at least one tire comprises the at least one inductor proximal to an outer surface of the tire.

8. The shielded mobile inductor system as in claim 6 wherein the at least one inductor positioned integral with the at least one tire comprises the at least one inductor proximal to an inner surface of the tire.

9. The shielded mobile inductor system as in claim 8 wherein the at least one inductor proximal to the inner surface of the tire further comprises the at least one inductor supported by an inner tube.

10. The shielded mobile inductor system as in claim 8 wherein the at least one inductor proximal to the inner surface of the tire further comprises the at least one inductor supported by a wheel rim.

11. The shielded mobile inductor system as in claim 6 wherein the at least one inductor positioned integral with the at least one tire comprises:
    at least one tire rim; and
    at least one inductive pickup attachable to the at least one tire rim.

12. The shielded mobile inductor system as in claim 11 wherein the at least one inductive pickup comprises at least one magnetic core wrapped by at least one conductive wire.

13. The shielded mobile inductor system as in claim 11 further comprises:
    a plurality of inductive pickups attachable to the at least one tire rim, and wherein each of the plurality of inductive pickups comprises:
       a plurality of magnetic cores wrapped by at least one conductive wire.

14. A method for inductive power transfer to an electric vehicle having an electric motor and a battery for providing battery power and having at least one tire on an electrified roadway, the method comprising:
    collocating an inductive pick up device with the at least one tire;
    inductively coupling power from the electrified roadway via the inductive pickup; and
    providing a controller for determining if there is sufficient inductive power to power the electric motor, and wherein determining there is insufficient inductive power, determining if there is sufficient inductive power and battery power to power the electric motor.

15. The method as in claim 14 further comprising:
    providing battery power if the inductively coupled power is insufficient to drive the electric motor; and
    determining if the inductively coupled power and battery power is sufficient to drive the electric motor.

16. The method as in claim 15 further comprising:
    determining if the battery power is sufficient to drive the electric drive motor; and
    providing combustion engine power if the battery power is insufficient to drive the electric motor.

17. The method as in claim 14 wherein collocating the inductive pick up device with the at least one tire further comprises positioning the at least one inductive pickup proximal to an outer surface of the tire.

18. The method as in claim 14 wherein collocating the inductive pick up device with the at least one tire further comprises positioning the at least one inductive pickup proximal to an inner surface of the tire.

19. The method as in claim 14 wherein collocating the inductive pick up device with the at least one tire further comprises supporting the at least one inductive pickup by an inner tube.

20. The method as in claim 14 wherein collocating the inductive pick up device with the at least one tire further comprises supporting the at least one inductive pickup by a tire rim.

* * * * *